(12) United States Patent
Eide (10) Patent No.: US 8,394,161 B2
(45) Date of Patent: Mar. 12, 2013

(54) HEPA FILTER CARTRIDGE FOR CANISTER VACUUMS

(75) Inventor: Andrew Eide, Rockwall, TX (US)

(73) Assignee: Aerus LLC, Dallas, TX (US)

( * ) Notice: Subject to any disclaimer, the term of this patent is extended or adjusted under 35 U.S.C. 154(b) by 545 days.

(21) Appl. No.: 12/388,445

(22) Filed: Feb. 18, 2009

(65) Prior Publication Data

US 2010/0205919 A1 Aug. 19, 2010

(51) Int. Cl.
*B01D 45/00* (2006.01)
*B01D 50/00* (2006.01)
*B01D 46/00* (2006.01)
*B01D 49/00* (2006.01)
*B01D 53/00* (2006.01)
*B01D 57/00* (2006.01)
*B01D 59/00* (2006.01)
*B01D 51/00* (2006.01)
*B01D 41/00* (2006.01)
*B01D 45/18* (2006.01)
*B01D 46/04* (2006.01)
*B01D 46/42* (2006.01)
*B01D 45/12* (2006.01)

(52) U.S. Cl. ............. 55/417; 55/424; 55/343; 55/429; 95/271

(58) Field of Classification Search .......... 55/417, 55/424, 343, 429; 95/271
See application file for complete search history.

(56) References Cited

U.S. PATENT DOCUMENTS

| | | | |
|---|---|---|---|
| 3,279,157 A | 10/1966 | Andersson-Sason et al. | |
| 5,433,763 A * | 7/1995 | Shagott et al. | 55/323 |
| 5,690,713 A | 11/1997 | Bowerman et al. | |
| 5,725,623 A | 3/1998 | Bowerman et al. | |
| 5,946,771 A | 9/1999 | Bosyj et al. | |
| 6,035,486 A | 3/2000 | McCormick | |
| 6,288,151 B1 * | 9/2001 | Lassila et al. | 524/100 |
| 6,361,587 B1 | 3/2002 | Rohn et al. | |
| 6,432,180 B2 | 8/2002 | Alberts, III et al. | |
| 6,546,593 B2 * | 4/2003 | Oh et al. | 15/353 |
| 6,609,270 B2 | 8/2003 | Kim | |
| 6,775,882 B2 * | 8/2004 | Murphy et al. | 15/352 |
| 6,807,707 B2 | 10/2004 | Park et al. | |
| 6,875,255 B2 | 4/2005 | Alford et al. | |
| 7,181,804 B2 | 2/2007 | Hafling et al. | |
| 7,185,394 B2 | 3/2007 | Hafling et al. | |
| 7,247,182 B2 | 7/2007 | Boyer, Jr. et al. | |
| 7,335,241 B2 * | 2/2008 | Oh et al. | 55/343 |
| 7,547,336 B2 * | 6/2009 | Fester et al. | 55/337 |
| 7,744,668 B2 * | 6/2010 | Oh et al. | 55/343 |
| 2005/0115409 A1 * | 6/2005 | Conrad | 95/271 |
| 2005/0252180 A1 * | 11/2005 | Oh et al. | 55/345 |
| 2007/0067948 A1 * | 3/2007 | Biere | 15/412 |
| 2008/0010958 A1 | 1/2008 | Fester et al. | |
| 2008/0264017 A1 * | 10/2008 | Oh et al. | 55/457 |
| 2010/0064895 A1 * | 3/2010 | Thurin et al. | 96/222 |

* cited by examiner

*Primary Examiner* — Amber Orlando
(74) *Attorney, Agent, or Firm* — Klemchuk Kubasta LLP; Darin M. Klemchuk; Kirby B. Drake (57) ABSTRACT

The present disclosure generally provides systems and methods for easily replaceable, high efficiency particulate air or HEPA-quality filtration for vacuum systems in an effective, efficient, and cost-sensitive manner. As an example, the HEPA filter cartridge could include a minimizer and connecting structures associated with an exhaust of such a HEPA filter cartridge. The surface area of the minimizer or the connecting structures could be increased or decreased to control, restrict, or otherwise maintain a predetermined, preferable, or allowable amount of backpressure subjected to the HEPA filter cartridge or other suitable performance characteristic.

16 Claims, 10 Drawing Sheets

HEPA FILTER CARTRIDGE FOR CANISTER VACUUMS

CROSS REFERENCE TO RELATED APPLICATION

This application claims benefit under 35 U.S.C. §120 of U.S. Design patent application Ser. Nos. 29/332,534 and 29/332,536 both filed currently with the present application on Feb. 18, 2009 in the United States Patent and Trademark Office entitled "HEPA Filter Cartridge for Canister Vacuums." The entire disclosures of U.S. Design patent application Ser. Nos. 29/332,534 and 29/332,536 are incorporated by reference as if fully disclosed herein.

TECHNICAL FIELD

The present disclosure generally relates to filter systems and, in particular, to HEPA filter cartridges.

BACKGROUND

High efficiency particulate air (HEPA) filters generally trap a large amount of very small particles that other filters would simply recirculate back into the ambient air. For a HEPA filter in a vacuum cleaner to be effective, however, the vacuum cleaner should ideally take the air drawn into the machine and expel that air through a filter that is efficient and easily changed to maintain such efficiency.

There is a need for systems and methods of providing easily replaceable, HEPA-quality filtration for vacuum systems in an effective, efficient, and cost-sensitive manner.

SUMMARY

Embodiments of the present disclosure generally provide systems and methods of providing easily replaceable, high efficiency particulate air or HEPA-quality filtration for vacuum systems in an effective, efficient, and cost-sensitive manner.

In one embodiment, the present disclosure could provide a filter cartridge. The filter could be configured to mate with a surface associated with a vacuum cleaner. The filter could include an opening configured to mate with an exhaust outlet of the vacuum cleaner. The filter could further include a minimizer disposed in the opening and configured to reduce backpressure on the filter.

In one embodiment, the present disclosure could provide a method of configuring a filter cartridge. The method could include measuring a performance characteristic of the filter cartridge. The method could also include adjusting a structural design of a minimizer associated with an exhaust opening of the filter cartridge to optimize the performance characteristic. The structural design could include the surface area of the minimizer.

In one embodiment, the present disclosure could provide a filter cartridge having a first and second surface. The filter cartridge could include a filter disposed along the first surface. The filter cartridge could also include a recessed area having a concave portion disposed on the second surface and configured to mate with a convex portion of a third surface associated with a vacuum cleaner. The filter cartridge could further include an opening disposed between the first surface and the second surface. The opening could be configured to mate with an exhaust outlet of the vacuum cleaner. The filter cartridge could still further include a minimizer disposed within the opening and configured to reduce backpressure on the filter.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure generally provides systems and methods of providing easily replaceable, high efficiency particulate air or HEPA-quality filtration for vacuum systems in an effective, efficient, and cost-sensitive manner.

Figure 1A:
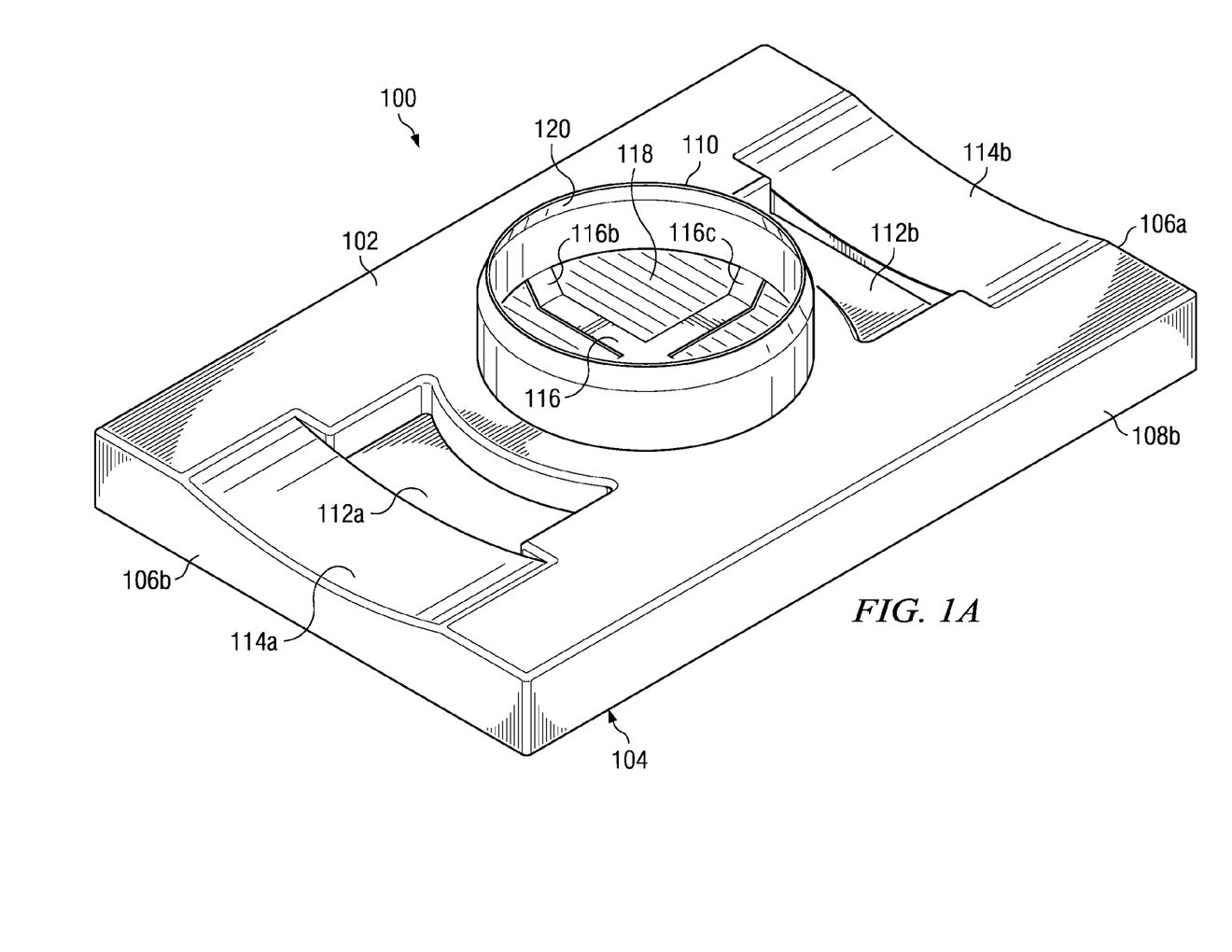
FIGS. 1A, 1B, and 1C are exemplary perspective views of high efficiency particulate air (HEPA) filter cartridges according to one embodiment of the present disclosure.
Figure 1B:
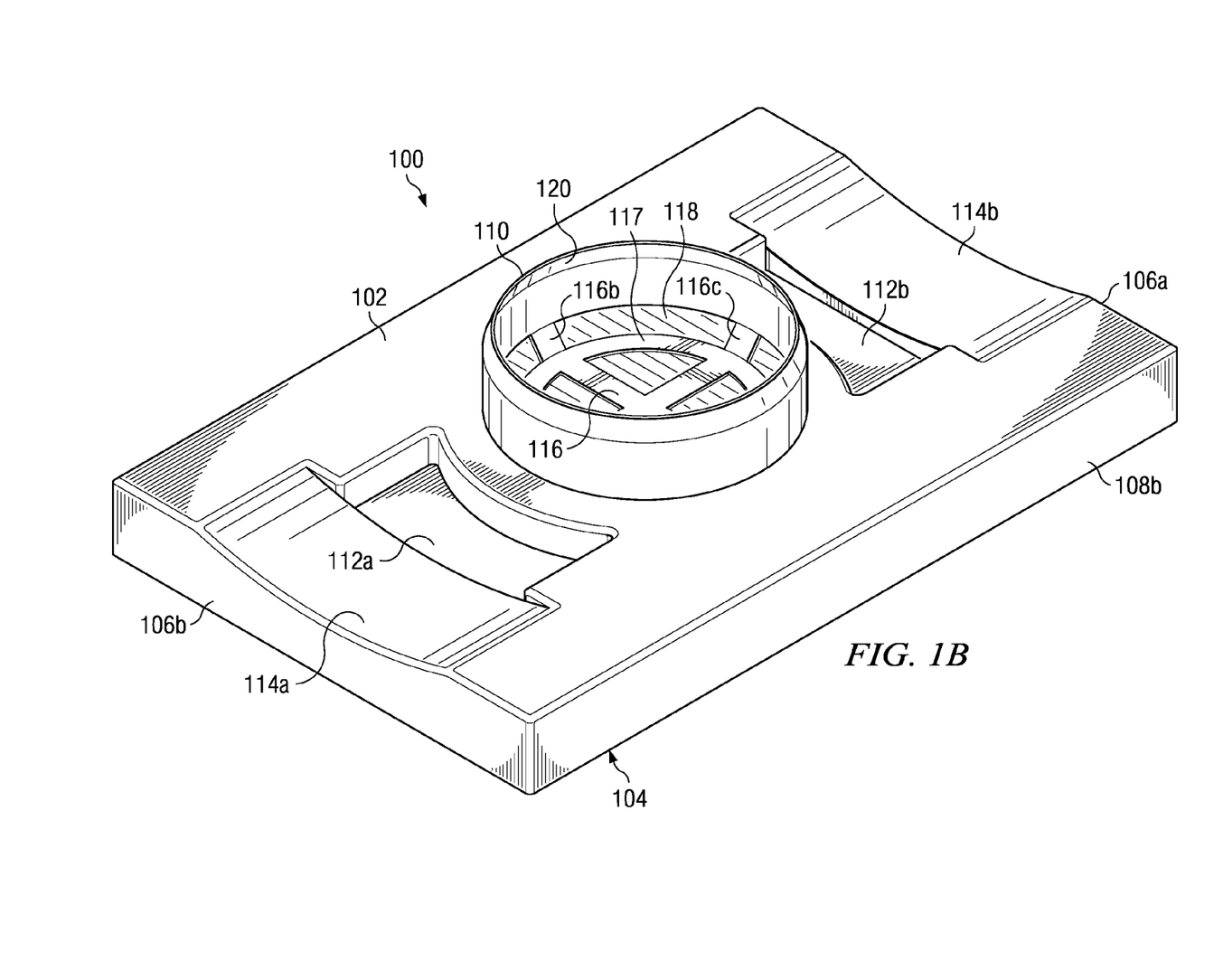
Figure 1C:
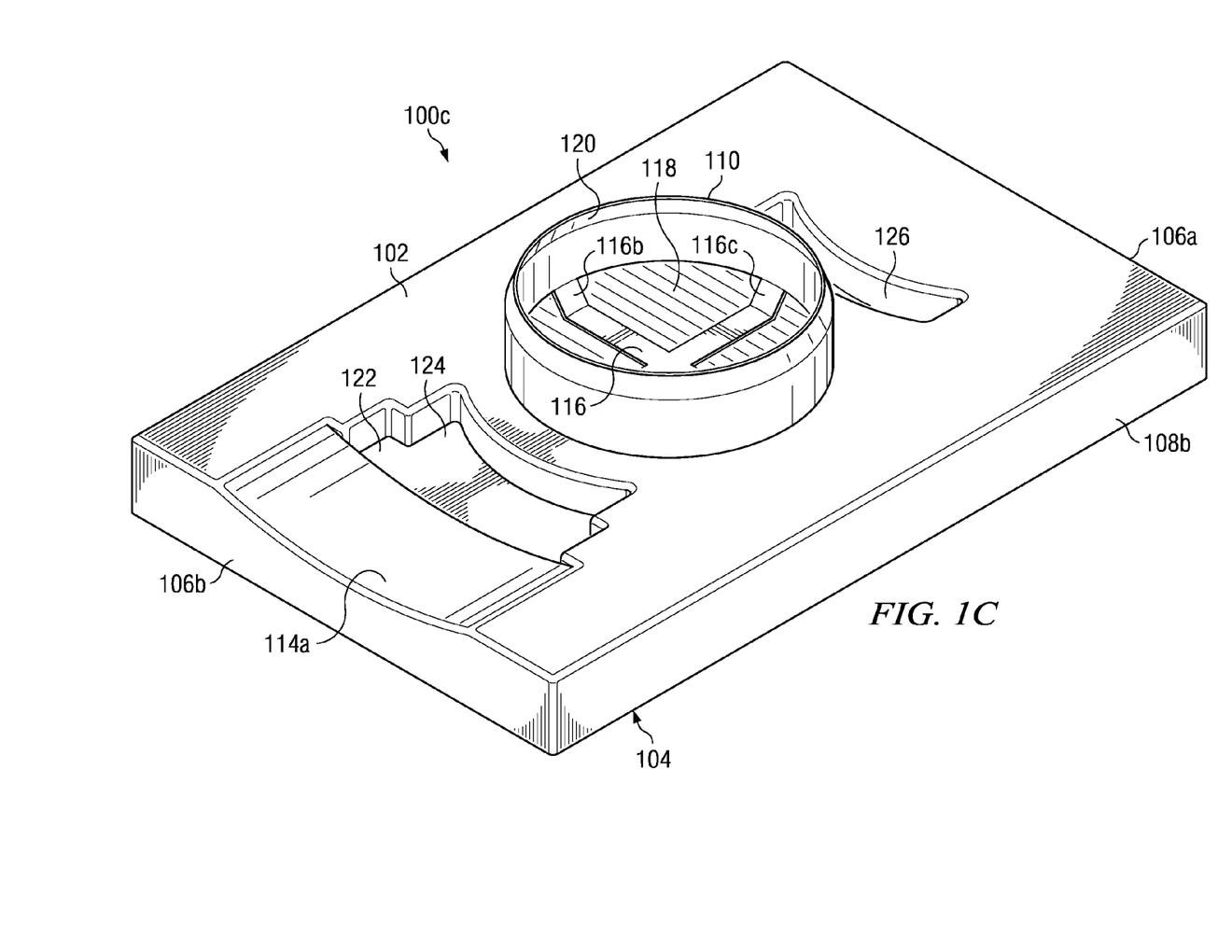
Figure 2:
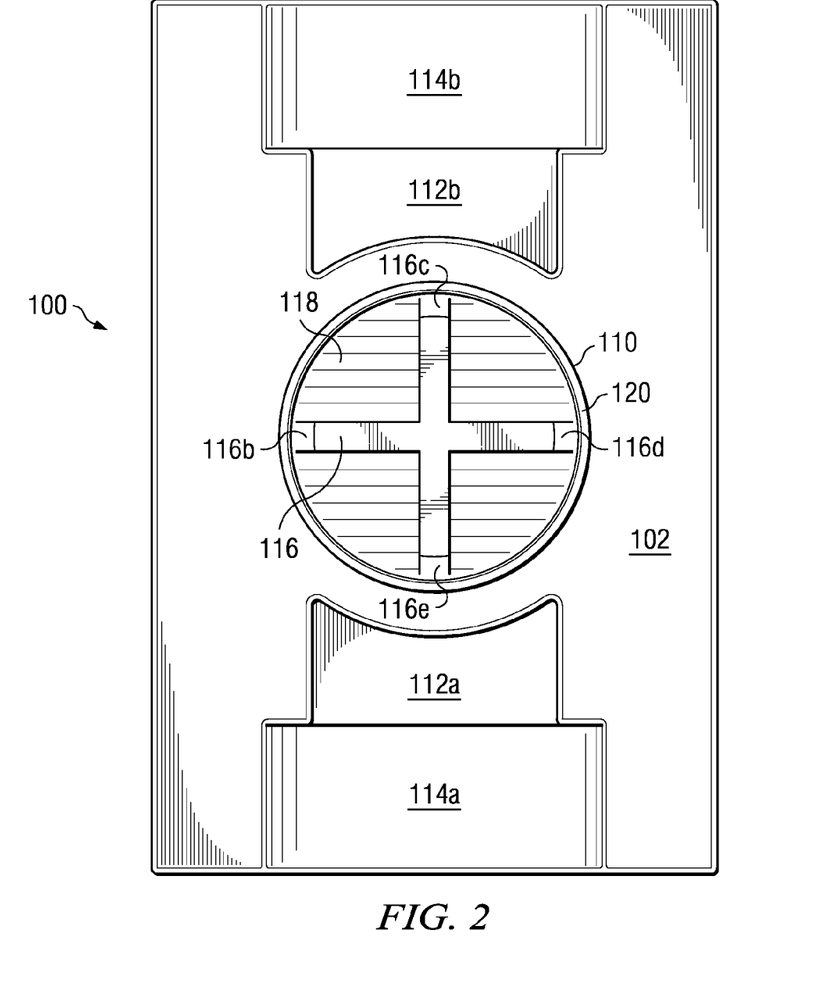
FIG. 2 is an exemplary top plan view of the HEPA filter cartridge shown in FIG. 1A according to one embodiment of the present disclosure.

FIGS. 1A, 1B, and 1C are perspective views of exemplary high efficiency particulate air (HEPA) filter cartridge systems 100a, 100b, and 100c (collectively referred to herein as systems 100) according to one embodiment of the present disclosure, while FIG. 2 is a top plan view of system 100a. It should be understood that systems 100 shown in FIGS. 1A, 1B, 1C, and 2 are for illustrative purposes only and that any other suitable system or subsystem could be used in conjunction with or in lieu of systems 100 according to one embodiment of the present disclosure.

Figure 3:
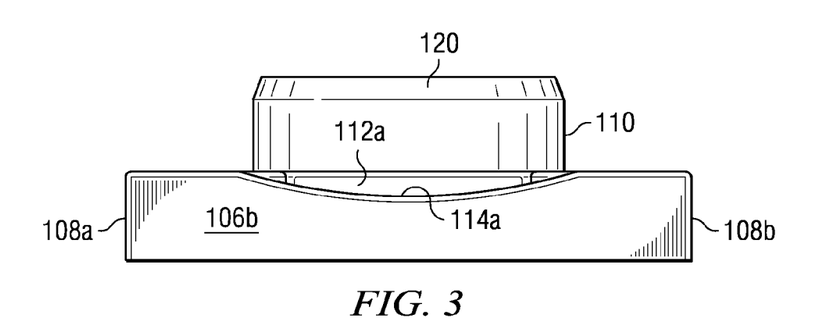
FIG. 3 is an exemplary side elevation view of the HEPA filter cartridge from the perspective of one end of the cartridge shown in FIG. 1A according to one embodiment of the present disclosure.
Figure 4:
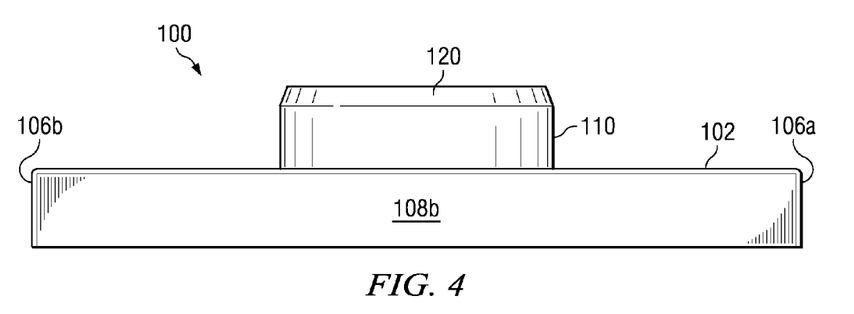
FIG. 4 is an exemplary side elevation view of the HEPA filter cartridge from the perspective of a second end of the cartridge shown in FIG. 1A according to one embodiment of the present disclosure.

Similarly, FIGS. 3 and 4 are exemplary side elevation views of systems 100 illustrated from the perspective of side surfaces 106 and lateral surfaces 108, respectively, according to one embodiment of the present disclosure. It should be understood that systems 100 shown in FIGS. 3 and 4 are for illustrative purposes only and that any other suitable system or subsystem could be used in conjunction with or in lieu of systems 100 according to one embodiment of the present disclosure.

It should also be understood that although the following description describes systems 100 as having a "HEPA filter cartridge," systems 100 could include any other suitable type of filter, cartridge-less filter, air filter, cleaning device, cleaner bag, dust trap, other suitable apparatus, or any combination thereof in combination with or in lieu of a "HEPA filter cartridge." It should be understood that systems 100 could be used as a drop-in, replaceable unit for use as a HEPA filter cartridge. In addition, systems 100 could be configured to be ergonomically conducive, environmentally friendly, recyclable, or any combination thereof.

In addition, although the present disclosure generally describes systems 100 for use in conjunction with a canister-style vacuum cleaner, it should be understood that systems 100 could be used with any suitable type of vacuum cleaner, air cleaner, air filter, air purifier, humidifier, de-humidifier, ionizer, exhaust system, air-circulating system, heating/cooling system, fan, other device requiring air filtration, or any combination thereof. Systems 100 could be used as a drop-in replaceable unit to a vacuum cleaner or similar system. In addition, systems 100 could be configured to meet certain environmental and air quality standards, be ergonomically designed, and recyclable.

In one embodiment, systems 100 could generally provide integrated HEPA filter cartridges that could include top surface 102, bottom surface 104, side surfaces 106*a* and 106*b* (collectively referred to herein as side surfaces 106), lateral surfaces 108*a* and 108*b* (collectively referred to herein as lateral surfaces 108), exhaust-opening 110, recessed areas 112*a* and 112*b* (collectively referred to herein as recessed areas 112), concave areas 114*a* and 114*b* (collectively referred to herein as concave areas 114), minimizer 116, filter 118, and lip 120 as shown in FIGS. 1A, 1B, 2, 3, and 4. In addition, system 100*b* could include ring 117, while system 100*c* FIG. 1C could include recessed area 122, recessed area 124, and recessed area 126.

Top surface 102, bottom surface 104, side surfaces 106, and lateral surfaces 108 could be configured in any suitable shape, size, or dimension. In addition, top surface 102, bottom surface 104, side surfaces 106, and lateral surfaces 108 could be made of any suitable material or combination of materials. Top surface 102, bottom surface 104, side surfaces 106, and lateral surfaces 108 could also be coated or otherwise treated with any suitable fabric, material, coating, plastic, rubber, laminate, hook and loop fastener materials, grooves, abrasives, polishes, any other surfaces or surface treatments, or combination thereof on the entire surface of top surface 102, bottom surface 104, side surfaces 106, and lateral surfaces 108, or any suitable portion of top surface 102, bottom surface 104, side surfaces 106, and lateral surfaces 108.

Top surface 102 could include exhaust-opening 110, recessed areas 112, concave areas 114, and lip 120, while bottom surface 104 could include filter 118 as shown in FIGS. 1A, 1B, 2, 3, and 4. In one embodiment, exhaust-opening 110 could be configured to generally mate with an exhaust port of, for example, a vacuum cleaner. The outer, inner, and any other surface of exhaust-opening 110 could be configured in any suitable shape, size, or dimension including, for example, an additional recessed area or lip 120. In addition, exhaust-opening 110 and lip 120 could be made of any suitable material or combination of materials.

Exhaust opening 110 and lip 120 could also be coated or otherwise treated with any suitable fabric, material, coating, plastic, rubber, laminate, hook and loop fastener materials, grooves, abrasives, polishes, any other surfaces or surface treatments, or combination thereof on the entire surface of exhaust opening 110, lip 120, or any suitable portion of exhaust opening 110 or lip 120. As one example, exhaust-opening 110 or lip 120 could include a gasket, sealant, rubber ring, washer, other suitable device, or any combination thereof, to aid in providing a seal between exhaust opening 110 and the exhaust port of the vacuum cleaner, between lip 120 and the exhaust port of the vacuum cleaner, or any combination thereof.

In one embodiment, exhaust-opening 110 could include minimizer 116 and connecting structures 116*b* and 116*c*, as shown in FIGS. 1A, 1B, 2, 3, and 4. Minimizer 116 could aid in providing some control over any back pressure, back airflow, and other performance related factors or characteristics attributed to the vacuum cleaner, systems 100, filter 118, or any combination thereof. For example, minimizer 116 could be configured to allow air circulation and flow in certain areas of exhaust opening 110, while restricting air circulation and flow in other areas of exhaust opening 110.

In one embodiment, systems 100 could customize the air circulation, flow, back draft, pressure, ion level, oxygen level, performance characteristic, other suitable factor, or any combination thereof, that could be associated with, flowing through, or subject to systems 100, by adjusting the size, shape, quantity, other suitable configuration, or any combination thereof to reduce, control, minimize, or maximize such characteristics. For example, the size, shape, quantity, configuration, other factor, or any combination thereof associated with exhaust opening 110, lip 120, minimizer 116 and any associated apertures, filter 118, or any combination thereof could be changed, altered, adjusted, or otherwise customized to such characteristics.

Although minimizer 116 is generally shown in a "crossbar" configuration in FIGS. 1A, 1B, and 2, minimizer 116 or any portion or surface of minimizer 116 could be configured in any suitable shape, size, configuration, and location relative to exhaust opening 110. For example, minimizer 116 could include a surface with a suitable number of apertures. The apertures could be any suitable shape, size, or configuration including, for example, annular, circular, oblong, square, rectangular, pentagonal, hexagonal, triangular, pie shaped, elongated slits, star shaped, other suitably shaped aperture, or any combination thereof. In addition, minimizer 116 could include any suitable number of apertures as generally shown and described in conjunction with the description accompanying FIGS. 6, 7, and 8 herein.

Minimizer 116 could be made of any suitable material or combination of materials. For example, minimizer 116 or any suitable portion of minimizer 116 could also be coated or otherwise treated with any suitable fabric, material, coating, plastic, rubber, laminate, hook and loop fastener materials, grooves, abrasives, polishes, any other surfaces or surface treatments, or combination thereof.

Minimizer 116 could include structures that aid in connecting minimizer 116 to exhaust opening 110. For example, minimizer 116 could have multiple connecting structures 116*b* and 116*c* as shown in FIGS. 1A and 1B. It should be understood, however, that although there are only two connecting structures 116b and 116c shown in FIGS. 1A and 1B, any suitable number of connecting structures could be used in accordance with the present disclosure. Connecting structures 116b and 116c could be configured in any suitable shape, size, or dimension. It should also be understood that connecting structures 116b and 116c need not be identical and could be configured differently from the other connecting structure.

Connecting structures 116b and 116c could be made of any suitable material or combination of materials. In addition, connecting structures 116b and 116c could also be coated or otherwise treated with any suitable fabric, material, coating, plastic, rubber, laminate, hook and loop fastener materials, grooves, abrasives, polishes, any other surfaces or surface treatments, or combination thereof on a portion of or the entire surface of connecting structures 116b and 116c. As one example, connecting structures 116b and 116c could include a gasket, sealant, rubber ring, washer, other suitable device, or any combination thereof, to aid in providing a structure, connection, seal, or other similar relationship between minimizer 116 and exhaust-opening 110.

Similar to minimizer 116, ring 117 shown in FIG. 1B could also be used to customize the air circulation, flow, back draft, pressure, ion level, oxygen level, performance characteristic, other suitable factor, or any combination thereof, that could be associated with, flowing through, or subject to systems 100, by adjusting the size, shape, quantity, other suitable configuration, or any combination thereof to reduce, control, minimize, or maximize such characteristics. For example, the size, shape, quantity, configuration, other factor, or any combination thereof associated with ring 117 could be changed, altered, adjusted, or otherwise customized to such characteristics. In one embodiment, ring 117 provides 360 degree air circulation in, around, along, or about filter 118. Ring 117 could be made of any suitable material or combination of materials and could include any suitable number of apertures similar to minimizer 116.

Top surface 102 could also include recessed areas 112 that are configured to mate with or otherwise configured to dispose along a complementary raised portion of a surface of a vacuum cleaner canister. For example, recessed areas 112 could be configured to mate or be disposed on a mating surface of a canister-style vacuum cleaner. Although recessed areas 112a and 112b are shown as generally identically shaped in FIGS. 1A, 1B, 2, 3, and 4, it should be understood that one or both of recessed areas 112a and 112b could be shaped, sized, or configured differently from the other. It should also be understood that although two recessed areas 112 are shown in FIGS. 1A, 1B, and 2, any suitable number or configuration of recessed areas 112 could be used in accordance with the present disclosure.

Similarly, top surface 102 could include, concave areas 114 that are configured to mate with or otherwise configured to dispose along a complementary raised, generally convex portion of a surface of a vacuum cleaner canister. For example, concave areas 114 could be configured to mate or be disposed on a mating surface of a canister-style vacuum cleaner. Although concave areas 114a and 114b are shown as generally identically shaped areas, it should be understood that one or both of concave areas 114a and 114b could be shaped, sized, or configured differently from the other. It should also be understood that although two concave areas 114 are shown in FIGS. 1A, 1B, and 2, any suitable number or configuration of concave areas 114 could be used in accordance with the present disclosure. In one embodiment, it should be understood, however, that systems 100 could include only one recessed area 114a and one concave area 114a.

System 100c shown in FIG. 1C could include recessed area 122, recessed area 124, and recessed area 126. Recessed area 122, recessed area 124, and recessed area 126 are configured to generally mate with or otherwise configured to dispose along a complementary raised, generally convex portion of a surface of a vacuum cleaner canister. For example, recessed area 122, recessed area 124, and recessed area 126 could be configured to mate or be disposed on a mating surface of a canister-style vacuum cleaner. It should be understood that one or any number of recessed area 122, recessed area 124, and recessed area 126 could be shaped, sized, or configured differently from the other. It should also be understood that any suitable number or configuration of recessed area 122, recessed area 124, and recessed area 126 could be used in accordance with the present disclosure.

Figure 5:
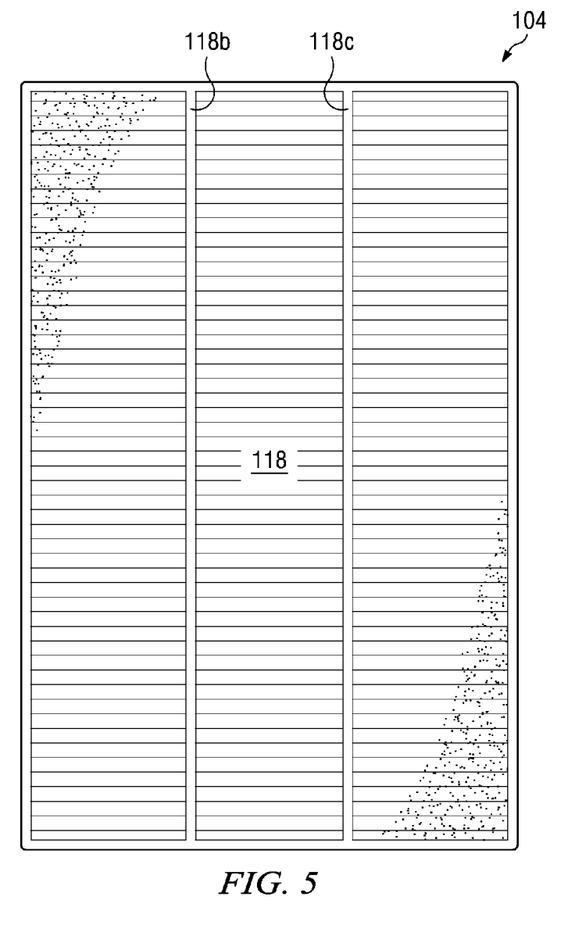
FIG. 5 is an exemplary bottom plan view of the HEPA filter cartridge shown in FIG. 1A according to one embodiment of the present disclosure.

FIG. 5 is a bottom plan view of systems 100 shown in FIGS. 1A and 1B in accordance with one embodiment of the present disclosure. It should be understood that systems 100 shown in FIG. 5 is for illustrative purposes only and that any other suitable system or subsystem could be used in conjunction with or in lieu of systems 100 according to one embodiment of the present disclosure.

Systems 100 include filter 118 as shown in FIG. 5. Filter 118 could include any suitable filter such as, for example, a true HEPA filter, a HEPA type filter, ionic filter, carbon filter, air filter, cloth filter, other suitable filter, or any combination thereof. In one embodiment, filter 118 could be a pleated, true HEPA filter as shown in FIG. 5. Filter 118 could additional include structures 118b and 118c to aid in providing structural support to filter 118. In order for filter 118 to function efficiently (and in some cases effectively) filter 118 could require, for example, proper structural support and close-to-ideal backpressure levels according to one embodiment of the present disclosure.

Figure 6:
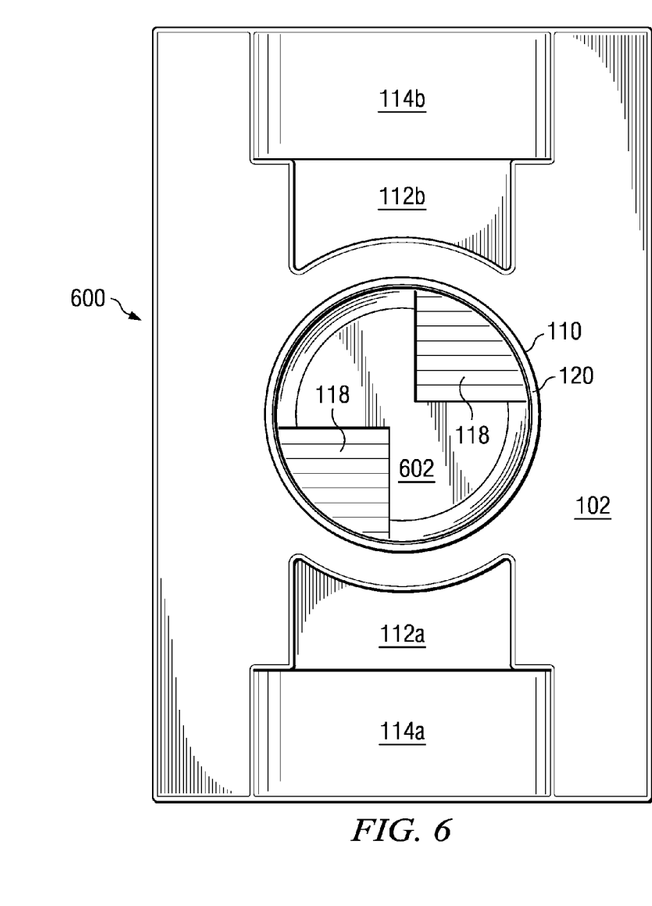
FIG. 6 is an exemplary top plan view of an exemplary HEPA filter cartridge having a partially blocked exhaust area according to one embodiment of the present disclosure.
Figure 7:
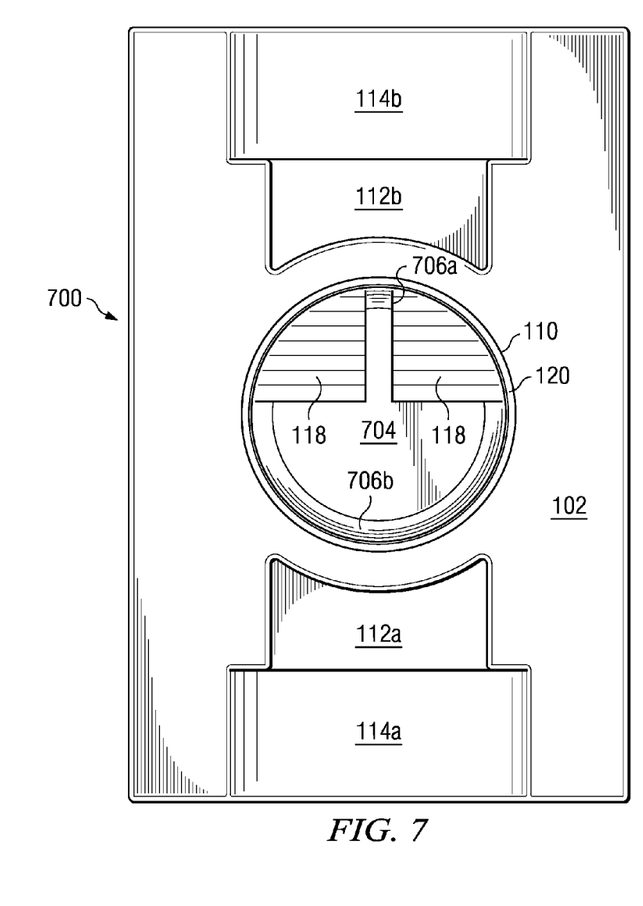
FIG. 7 is an exemplary top plan view of another exemplary HEPA filter cartridge having a partially blocked exhaust area according to one embodiment of the present disclosure.
Figure 8:
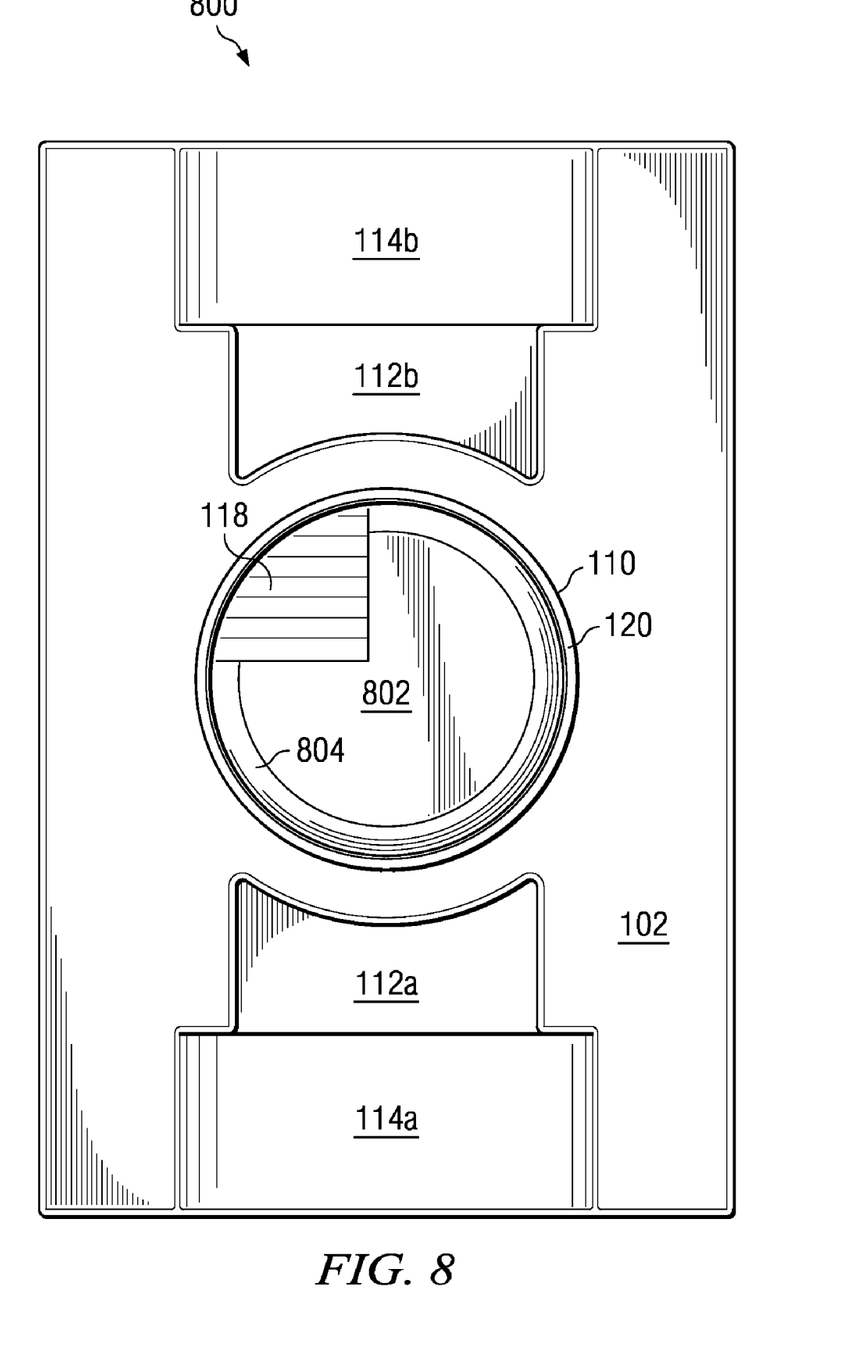
FIG. 8 is an exemplary top plan view of still another exemplary HEPA filter cartridge having a partially blocked exhaust area according to one embodiment of the present disclosure.

FIGS. 6, 7, and 8 are generally front elevation views of HEPA filter cartridge systems 600, 700, and 800, respectively. Systems 600, 700, and 800 are similar to systems 100 shown in FIGS. 1A and 1B. It should be understood that HEPA filter cartridge systems 600, 700, and 800 shown in FIGS. 6, 7, and 8 are for illustrative purposes only and that any other suitable system or subsystem could be used in conjunction with or in lieu of systems 600, 700, and 800 according to one embodiment of the present disclosure.

System 600, like systems 100, could provide an integrated HEPA filter cartridge that includes top surface 102, exhaust-opening 110, recessed areas 112, concave areas 114, ring 117, filter 118, and lip 120 as shown in FIGS. 1A, 1B, 2, 3, 4, and 6.

System 600 could also include minimizer 602. In the embodiment shown in FIG. 6, minimizer 602 includes two pie-shaped apertures. It should be understood, however, that minimizer 602 could include a surface with any suitable number of apertures. The apertures could be any suitable shape, size, or configuration including, for example, annular, circular, oblong, square, rectangular, pentagonal, hexagonal, elongated slits, star-shaped, any other suitably shaped aperture, or combination thereof. In addition, minimizer 602 could include any suitable number of apertures.

System 700 shown in FIG. 7 could include similar elements to systems 100. For example, system 700, like systems 100, could provide an integrated HEPA filter cartridge that includes top surface 102, exhaust-opening 110, recessed areas 112, concave areas 114, filter 118, and lip 120 as shown in FIGS. 1A, 1B, 2, 3, and 4.

System 700 could include minimizer 702 as shown in FIG. 7. In one embodiment, minimizer 702 could include two pie-shaped apertures. In addition, minimizer 702 could include connecting structures 706a and 706b (collectively referred to herein as connecting structures 706). It should be understood, however, that minimizer 702 could include a surface with any suitable number of apertures. The apertures could be any suitable shape, size, or configuration including, for example, annular, circular, oblong, square, rectangular, pentagonal, hexagonal, elongated slits, star-shaped, any other suitably shaped aperture, or combination thereof. In addition, minimizer 702 could include any suitable number of apertures.

Connecting structures 706 could be similar to connecting structures 116b and 116c and could be configured in any suitable shape, size, or dimension, or made of any suitable material or combination of materials to aid in providing a structure, connection, seal, or other similar relationship between minimizer 116 and exhaust-opening 110.

Similarly, system 800 could include minimizer 802 and connecting structure 804 as shown in FIG. 8. In the embodiment shown in FIG. 8, minimizer 802 includes a single pie-shaped aperture. It should be understood, however, that minimizer 802 could include a surface with any suitable number of apertures. The apertures could be any suitable shape, size, or configuration including, for example, annular, circular, oblong, square, rectangular, pentagonal, hexagonal, elongated slits, star-shaped, any other suitably shaped aperture, or combination thereof. In addition, minimizer 802 could include any suitable number of apertures.

Connecting structure 804 could be similar to connecting structures 116b and 116c and could be configured in any suitable shape, size, or dimension, or made of any suitable material or combination of materials to aid in providing a structure, connection, seal, or other similar relationship between minimizer 116 and exhaust-opening 110.

Figure 9:
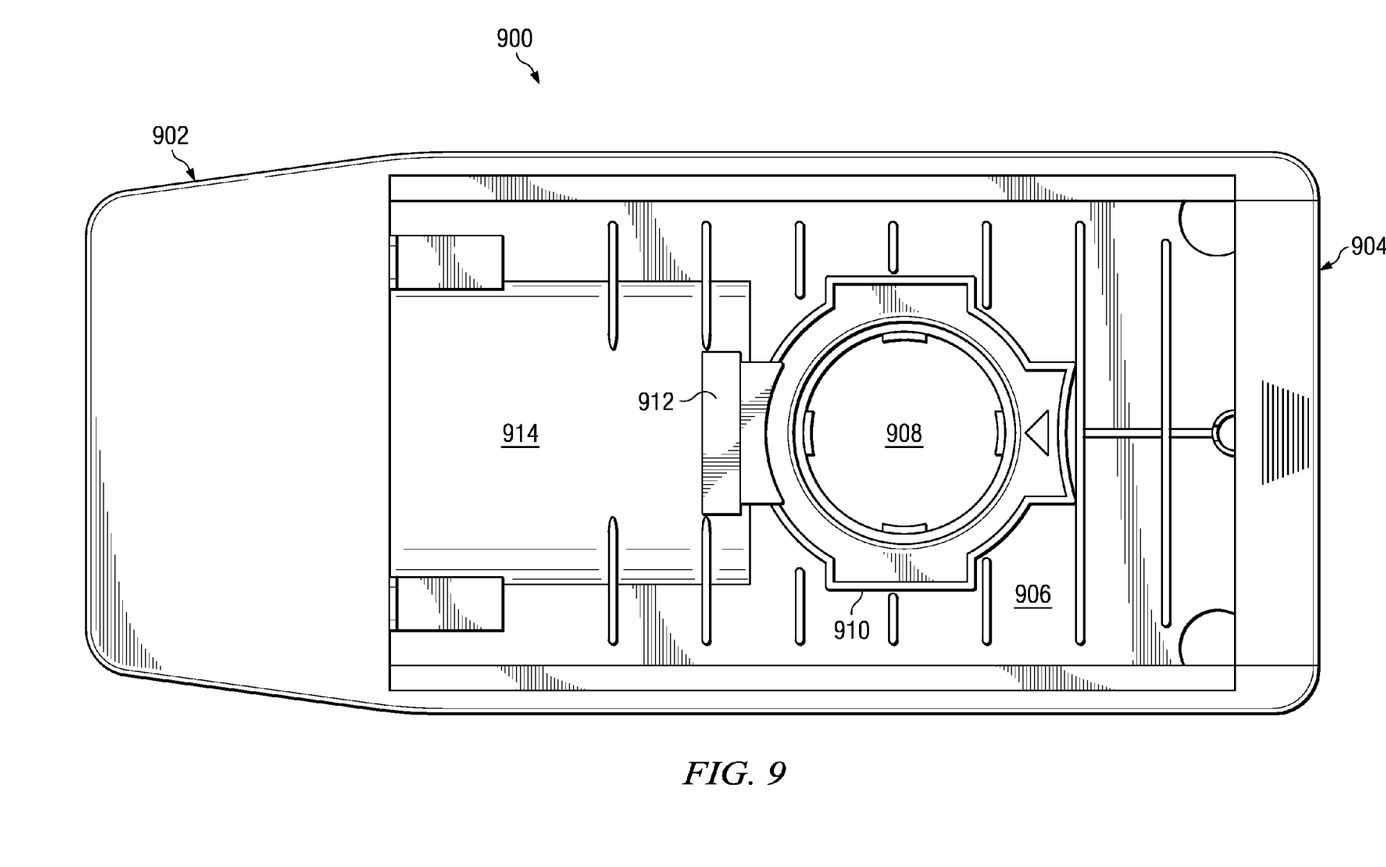
FIG. 9 is an exemplary top plan view of a canister-style vacuum cleaner configured for the HEPA filter cartridges shown in FIGS. 1A, 1B, 1C, and 2-8 according to one embodiment of the present disclosure.

FIG. 9 illustrates a top plan view of an exemplary vacuum cleaner canister 900 in an open or accessible disposition and configured to use, for example, the HEPA filter cartridge systems shown in FIGS. 1A, 1B, 2-8 according to one embodiment of the present disclosure. It should be understood that vacuum canister 900 shown in FIG. 9 is for illustrative purposes only and that any other suitable system or subsystem could be used in conjunction with or in lieu of vacuum canister 900 according to one embodiment of the present disclosure.

It should also be understood that vacuum canister 900 could include, be substituted by, or otherwise use any suitable type of vacuum cleaner, air cleaner, air filter, air purifier, humidifier, de-humidifier, ionizer, exhaust system, air-circulating device, heating/cooling system, fan, other device requiring air filtration, or any combination thereof.

Vacuum canister 900 could generally include front end 902, back end 904, compartment 906, exhaust 908, ring 910, raised portion 912, and convex area 914. Front end 902 of could generally be associated with the suction system or portion of the vacuum cleaner, while back end 904 could be associated with other functions. Compartment 906 is generally configured to removably house the HEPA filter cartridge systems shown in FIGS. 1-8.

Figure 10:
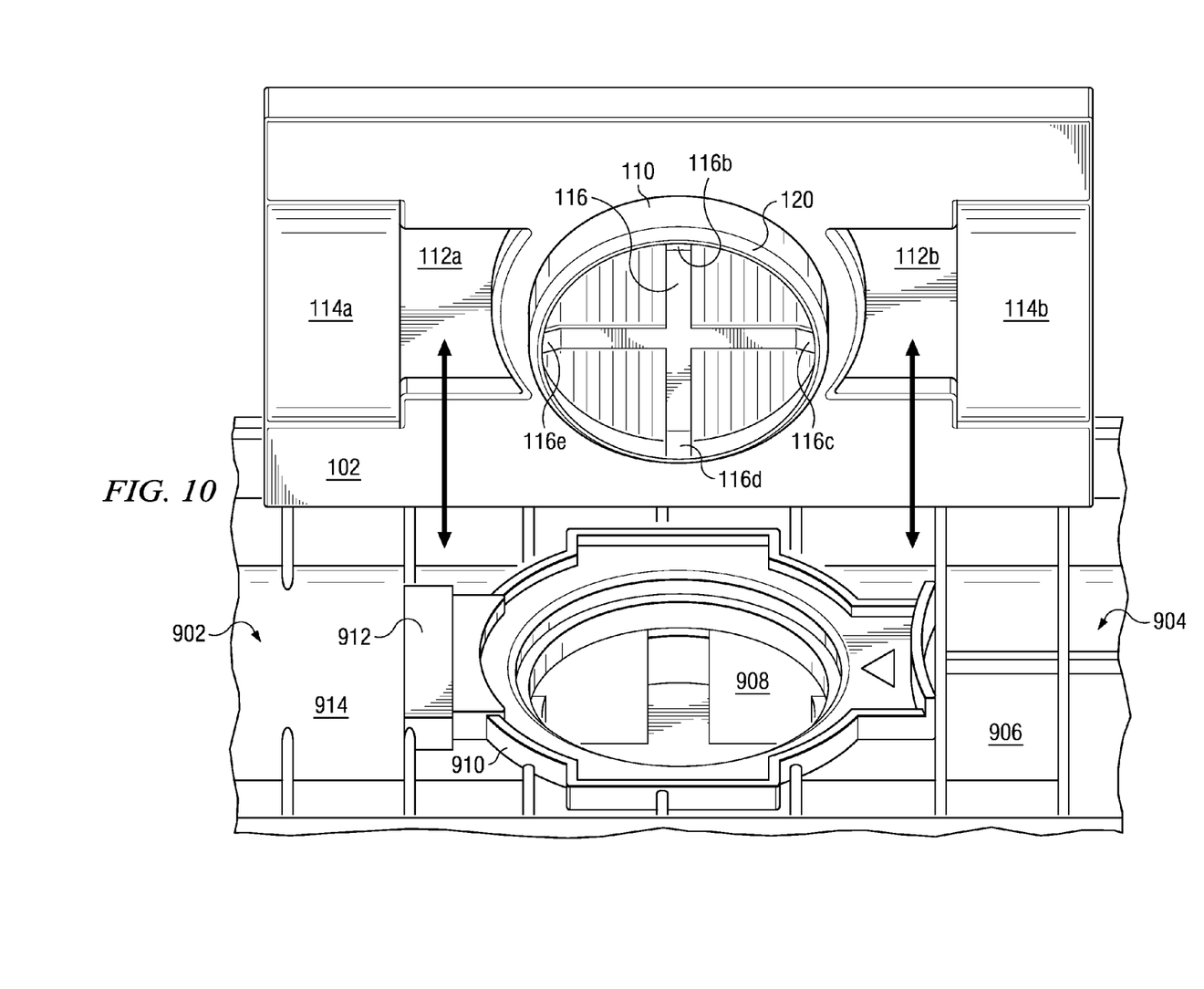
FIG. 10 illustrates a possible positional relationship between the canister-style vacuum cleaner shown in FIG. 9 and the HEPA filter cartridge shown in FIG. 1A according to one embodiment of the present disclosure.

FIG. 10 illustrates a possible positional relationship between vacuum canister 900 shown in FIG. 9 and system 100a shown in FIG. 1A according to one embodiment of the present disclosure. It should be understood that system 100a and vacuum canister 900 shown in FIG. 10 is for illustrative purposes only and that any other suitable system or subsystem, including systems 100b and 100c, could be used in conjunction with or in lieu of system 100a or vacuum canister 900 according to one embodiment of the present disclosure.

Compartment 906 could be configured to removably house or otherwise retain systems 100 as illustrated in FIG. 10. In one embodiment, compartment 906 could be configured to generally mate with or otherwise dispose systems 100 or parts of systems 100 in a relatively fixed position as shown in FIG. 10. Similarly, exhaust 908 could be configured to generally mate with or otherwise dispose systems 100 and, in particular, exhaust-opening 110 in a relatively fixed position as shown in FIG. 10.

In one embodiment, ring 910 and raised portion 912, could be configured to generally mate with or otherwise dispose systems 100 and, in particular, recessed area 112a or 112b as shown in FIG. 10. In addition, convex area 914 could be configured to generally mate with or otherwise dispose systems 100 and, in particular, concave area 114a as shown in FIG. 10.

Figure 11:
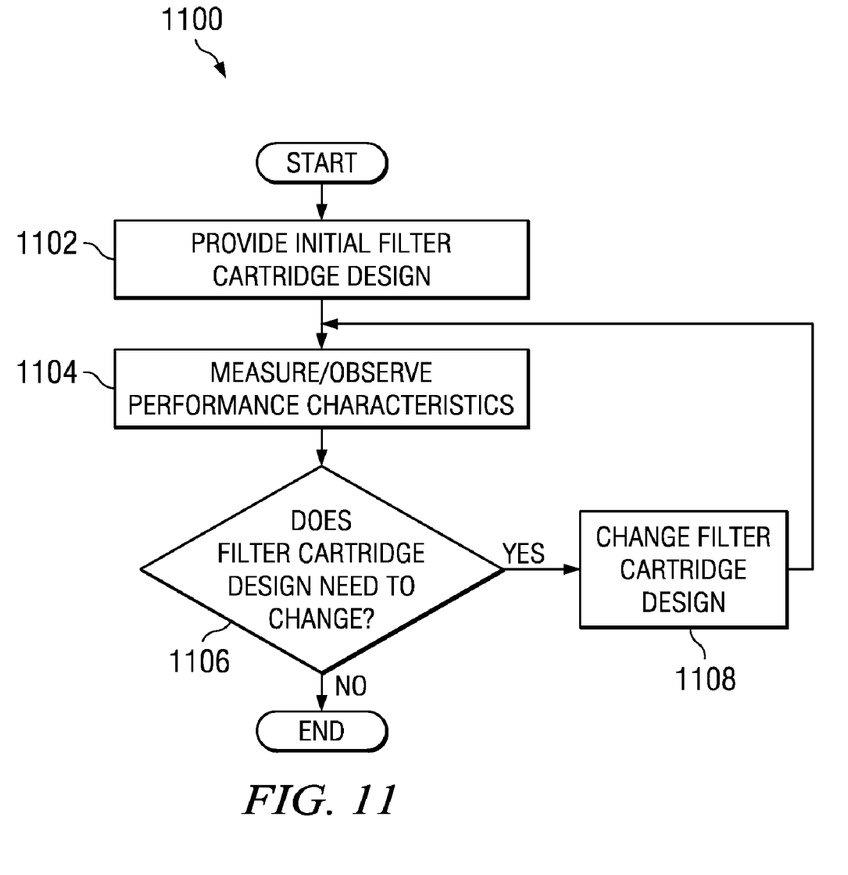
FIG. 11 is an exemplary somewhat simplified flow diagram illustrating a method of adjusting performance characteristics of the HEPA filter cartridge according to one embodiment of the present disclosure.

FIG. 11 is a somewhat simplified flow diagram illustrating an exemplary method 1100 for adjusting general air circulation and the amount of backpressure subjected to a HEPA filter cartridge according to one embodiment of the present disclosure. It should be understood that method 1100 shown in FIG. 11 is for illustrative purposes only and that any other suitable method or sub-method could be used in conjunction with or in lieu of method 1100 according to one embodiment of the present disclosure.

Method 1100 could include providing an initial air exhaust intake such as, for example, exhaust-opening 110 shown in FIGS. 1A and 1B, having a minimizer and a ring such as, for example, minimizer 116 and ring 117, for a HEPA filter cartridge such as, for example, HEPA filter cartridge systems 100 in step 1102.

In step 1104, method 110 could include measuring or otherwise observing the performance characteristics of systems 100. For example, in one embodiment, method 1100 could include measuring or otherwise observing whether filter 118 is experiencing less than ideal backpressure, airflow levels, other performance factors and conditions, or any combination thereof.

In step 1106, method 1100 could ascertain whether the measurements or observations in step 1104 need to be addressed. If no further attention is required, minimizer 116, apertures associated with minimizer 116, connecting structures 116b-e, and ring 117 are most likely optimized or configured correctly and method 1100 ends.

Otherwise, if in step 1106 method 1100 ascertains that further attention may be required, then method 1100 could include either restricting or allowing more air flow or back pressure by decreasing or increasing the surface area of minimizer 116, ring 117, or connecting structures 116b or 116c in step 1108.

In one embodiment, for example, if the tolerance levels for backpressure have not been met or could be increased to meet a particular preference, then method 1100 could decrease the surface area of minimizer 116, ring 117, connecting structures 116b or 116c, or any combination thereof to further allow backpressure subjected to filter 118 in step 1108. Otherwise, based on the measurements or observations in step 1104, method 1100 could increase the surface area of minimizer 116 or connecting structures 116b or 116c to further restrict backpressure subjected to filter 118 in step 1108.

Accordingly, in one embodiment, the present disclosure provides systems and methods for easily replaceable, HEPA-quality filtration for vacuum systems in an effective, efficient, and cost-sensitive manner. As an example, minimizer 116 or connecting structures 116b or 116c could be used to configure systems 100 to control or otherwise restrict the amount of backpressure subjected to filter 118 as shown and described in conjunction with the description accompanying, for example, FIGS. 1 and 11. In one embodiment for example, the surface area of minimizer 116 or connecting structures 116b or 116c could be increased or decreased to control, restrict, or otherwise maintain a predetermined, preferable, or allowable amount of backpressure subjected to systems 100 and, in particular, to filter 118.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of configuring a filter cartridge, the method comprising:
    measuring a performance characteristic of the filter cartridge; and
    adjusting a structural design of a minimizer associated with an exhaust opening of the filter cartridge to optimize the performance characteristic, wherein the structural design comprises the surface area of the minimizer.

2. A filter cartridge comprising:
    a top surface having recessed areas and concave areas,
    an exhaust opening disposed between the top surface and a bottom surface, the exhaust opening including a minimizer configured to control backpressure on a filter disposed along a bottom surface,
    wherein the recessed areas are disposed on opposing sides of the exhaust opening and between the exhaust opening and the concave areas, and
    wherein the recessed areas mate with complementary raised portions of a surface of a vacuum cleaner canister, the concave areas mate with complementary convex portions of the surface of the vacuum cleaner canister, and the exhaust opening mates with an exhaust outlet of the vacuum cleaner canister, the exhaust outlet positioned between the complementary raised portions of the surface of the vacuum cleaner canister.

3. The filter cartridge of claim 2 further comprising:
    a ring structure disposed in the exhaust opening adjacent to the minimizer.

4. The filter cartridge of claim 2 further comprising:
    an air flow-through area disposed in the exhaust opening adjacent to the minimizer, wherein the air flow-through area is configured to allow air flow to the filter.

5. The filter cartridge of claim 2, wherein a surface area of the minimizer is adjustable to control backpressure on the filter.

6. The filter cartridge of claim 2, wherein the minimizer comprises a plurality of apertures.

7. The filter cartridge of claim 2, wherein the minimizer comprises a crossbar configuration.

8. The filter cartridge of claim 2, wherein the filter comprises at least one of: a high efficiency particulate air (HEPA) filter, a true HEPA filter, a HEPA-like filter, and an air filter.

9. A filter cartridge comprising:
    a filter disposed within an exhaust opening, the exhaust opening configured to mate with an exhaust outlet disposed adjacent to a raised portion on a surface of a vacuum cleaner, the raised portion mating with one or more recessed areas disposed on opposing sides of the exhaust opening; and
    a minimizer disposed within the exhaust opening, wherein the surface area of the minimizer is adjustable to restrict or allow more backpressure on the filter.

10. The filter cartridge of claim 9 further comprising:
    one or more concave areas, wherein the one or more recessed areas are disposed between the one or more concave areas and the exhaust opening.

11. The filter cartridge of claim 10, wherein the one or more concave areas mate with a convex area on the surface of the vacuum cleaner, wherein the raised portion is disposed between the exhaust outlet and the convex area.

12. The filter cartridge of claim 9 further comprising:
    a ring structure disposed within the exhaust opening around the circumference of the exhaust opening.

13. The filter cartridge of claim 9 further comprising:
    a lip disposed around the circumference of the exhaust opening to mate with the exhaust outlet.

14. The filter cartridge of claim 9 wherein the minimizer comprises a plurality of apertures.

15. The filter cartridge of claim 9 wherein the minimizer comprises a cross-bar structure.

16. The filter cartridge of claim 9, wherein the filter comprises at least one of: a high efficiency particulate air (HEPA) filter, a true HEPA filter, a HEPA-like filter, and an air filter.

* * * * *